United States Patent [19]

Vesterinen

[11] Patent Number: 5,533,116
[45] Date of Patent: Jul. 2, 1996

[54] NETWORK MANAGEMENT SYSTEM

[75] Inventor: Timo Vesterinen, Espoo, Finland

[73] Assignee: Nokia Telecommunications OY, Espoo, Finland

[21] Appl. No.: 302,793

[22] PCT Filed: Mar. 10, 1993

[86] PCT No.: PCT/FI93/00087

§ 371 Date: Nov. 7, 1994

§ 102(e) Date: Nov. 7, 1994

[87] PCT Pub. No.: WO93/18598

PCT Pub. Date: Sep. 16, 1993

[30] Foreign Application Priority Data

Mar. 10, 1992 [FI] Finland ..................... 921035

[51] Int. Cl.⁶ ..................... H04M 3/64
[52] U.S. Cl. ............ 379/243; 379/289; 379/207; 379/93
[58] Field of Search .................... 379/242, 243, 379/112, 115, 221, 207, 93, 97, 289

[56] References Cited

U.S. PATENT DOCUMENTS

| | | | |
|---|---|---|---|
| 4,782,506 | 11/1988 | Seveik | 379/10 |
| 5,133,004 | 7/1992 | Heilman, Jr. et al. | 379/97 |
| 5,285,494 | 2/1994 | Sprecher et al. | 379/115 |

OTHER PUBLICATIONS

International Telecommunications Union, CCITT, The International Telegraph and Telephone Consultative Committee, Red Book, vol. VI–Fascicle VI.13, "Man–Machine Language (MML), Recommendations Z.301–Z.341", Oct. 8–19, 1984, pp. 14–22.

Primary Examiner—Ahmad F. Matar
Attorney, Agent, or Firm—Cushman Darby & Cushman

[57] ABSTRACT

A network management system for configurating and reading data and states of several network elements, such as telephone exchanges, of a telecommunication network by giving the network elements commands according to their internal command language when at least some of the network elements of the telecommunication network have mutually different internal command languages includes a memory for storing parameters describing the command language of each network element, a generator for generating service requests (Rq) in a network element-independent format, a converter (21, 22, 23) for converting the network element independent service requests into commands according to the command language of the network element which is the target of service by using parameters describing the command language of the network element, and a sender for sending the generated commands to the network element which is the target of service. The network management updates the parameter files automatically by giving the network elements a specific command which reads the internal data structures, such as syntactic, semantic and user help data, of any other internal command or command response of the network element.

11 Claims, 1 Drawing Sheet

NETWORK MANAGEMENT SYSTEM

BACKGROUND OF THE INVENTION

The invention relates to a network management system for configurating and reading data and states of several network elements, such as telephone exchanges, of a telecommunication network by giving the network elements commands according to their internal command language when at least some of the network elements of the telecommunication network have mutually different internal command languages, the system comprising memory means for storing parameters describing the command language of each network element, means for generating service requests in a network element independent format, conversion means for converting the network element independent service requests into commands according to the command language of the network element which is the target of service by means of parameters describing the command language of the network element, means for sending the generated commands to the network element which is the target of service, means for receiving command responses sent by the network element which is the target of service and for converting them into a network element independent format.

Modern telecommunication networks comprise a large number of different kinds of network elements, such as telephone exchanges, transmission systems, etc., the states and data of which the network operator must read and change daily. Typical examples of recurrent changes are deletion, addition or modification of subscribers, and different changes in routing for instance when a network element is overloaded. The exchanges are controlled either by remote control or locally by in-putting commands for configurating their data, changing their states, etc. A modern telephone exchange may have several hundreds of different commands by which exchange specific data can be modified. On the other hand, many kinds of data are received from the exchanges: alarm outputs, measurement reports, charging data.

There have been attempts to develop network management systems which in a centralized manner would carry out the configuration and reading of data and states of different network elements in a telecommunication network. At present, the standardization organizations (e.g. ETSI, CCITT) are specifying the management standards for telephone exchanges and all network elements in general. Such a concept is called a TMN (Telecommunication Management Network). Standardized interfaces between the control system and the network elements are of crucial importance in standardization. However, such new standardized solutions will not be available for a long time and will require planning with respect to all network elements, wherefore it takes a long time before they are used for controlling all the network elements. Until then, the network management systems to be implemented must communicate with existing network elements in a manner which they understand in their internal command languages, which in telephone exchanges, for example, are manufacturer and type specific. New versions of command languages are created with new system generations of different telephone exchanges of the same manufacturer and with new software versions. This poses great problems for outside network management systems which are completely independent of the network elements but which should, however, master the different command languages and their versions. Network management should further be capable of adapting to a new command language whenever a new network element is introduced to the telecommunication network. At its worst, this results in that the operator of the network management system must continually modify his network management software in order to meet this requirement. The network management becomes more and more difficult when the number of network elements increases.

U.S. Pat. No. 4,782,506 discloses a network management system which operates one or more exchanges connected thereto. The management system is provided with correlation memories, in which there are stored the structural data of both commands and command responses of different exchanges. In addition, the formal representations of different operations are stored in SDL/PR format in the correlation memories; in fact, these representations describe the management operations in detail, i.e. how the different operations of the exchange are performed step by step, command by command. These data have contributed to network management that is to a great extent independent of the type of the system to be controlled. The operator gives commands in a universally applicable formal format, from which they are converted into the command language of the exchange. The structural representations of the commands and command responses of all exchanges are written and updated manually through a specific editing console in relational memories.

In practice, however, network management systems manage very large telecommunication networks, which may comprise dozens, even hundreds of exchanges. The exchanges are continuously modified, and new exchanges are connected under the management. Software is updated, and often the changes can also be seen in the interface with the management system. The syntax of commands may change: new parameters are added, new fields appear in the command responses, or completely new commands may be generated. In order for the management system to function appropriately, it is crucial at the same time to keep the correlation memories up to date. Even small modifications of command responses, in particular, may lead to total malfunctions. It is nevertheless problematic to keep the correlation memories up to date. It is very laborious to perform this task for instance by manual programming, and errors are easily made, as, e.g., modern telephone exchanges may include hundreds of different commands.

SUMMARY OF THE INVENTION

The object of the invention is to provide a network management system in which the above-mentioned drawback can be decisively remedied.

This is achieved with a network management system as described in the introductory portion, this system being characterized according to the invention in that the internal commands of at least one network element include a reading command for reading the internal data structures, such as syntactic, semantic and user help data, of any other internal command or command response of the network element, and that by means of the reading command the network management system automatically updates the parameters which describe the command language of the network element and are stored in the memory means.

In the network management system according to the invention, the user, such as the network operator, can program his or her daily routines into services which are easy to use and independent of the network elements. The system according to the invention converts the network element independent tasks of these services or service requests automatically into commands in the command language of the network element which is the target of service, using parameters that are stored in the network management system and describe the command language of the network element concerned. The parameters describing the command language of each network element under the network management system are stored in a separate file. Correspondingly, the network management system analyzes network element-specific command responses and converts them into a network element-independent format.

The invention enables the user to start all the network management routines in the same way without having to know what command language the network element that is the target of the service routine uses or without having to know the details of the command language. The user application programs form general, network element independent service requests which contain the necessary control parameters, such as the target of service and the data to be modified. These general service requests are converted into network element-specific tasks containing a number of network element-dependent command requests. By means of these network element-specific command requests and the stored parameters describing the command language it is possible to form the commands of a certain network element necessary for carrying out the task. The control parameters given in the network element-independent service request are disposed in these commands in the manner required by the structure of the command language. Each network element-independent general command request comprises, for each network element, a separate network element-specific or command language-specific task with command requests. When a new network element with a new command language is brought under the network management system, the user himself or herself may program the parameter file describing the command language and the network element-dependent tasks (task macros) into the command language in question for the network element-independent service requests desired. Once the task macros have been formed, the user no longer has to know anything about the command language used by the network element concerned. In the network management system of the invention, addition of new command languages or modification of the old ones brings about changes only on the lowest level of hierarchy in the generation of command languages without requiring any other modifications in the network management system; it can therefore be easily carried out by the user himself or herself.

It is very laborious to program the parameter file describing the internal command language of a network element, for instance manually, and errors are easily made, as, e.g., modern telephone exchanges may include hundreds of different commands. According to the invention, the internal commands of a network element include a specific reading command for reading the internal information structures—such as syntactic, semantic and user help data—of any other internal command or command response of the network element. Using this command, the user can automatically control the desired network element from the network management system, read the parameters describing the command language of the network element, and update them automatically in the corresponding file. Alternatively, the same reading command renders it possible to read these parameters temporarily to another memory, e.g. a memory disk, by means of which they can be easily transmitted to a file of the network management system. This arrangement expedites and facilitates the formation of parameter files considerably, and eliminates errors that are easily made in the formation.

BRIEF DESCRIPTION OF THE DRAWING

In the following, the invention will be described in more detail by means of embodiments and with reference to the accompanying drawing, in which.

DETAILED DESCRIPTION

Figure 1:
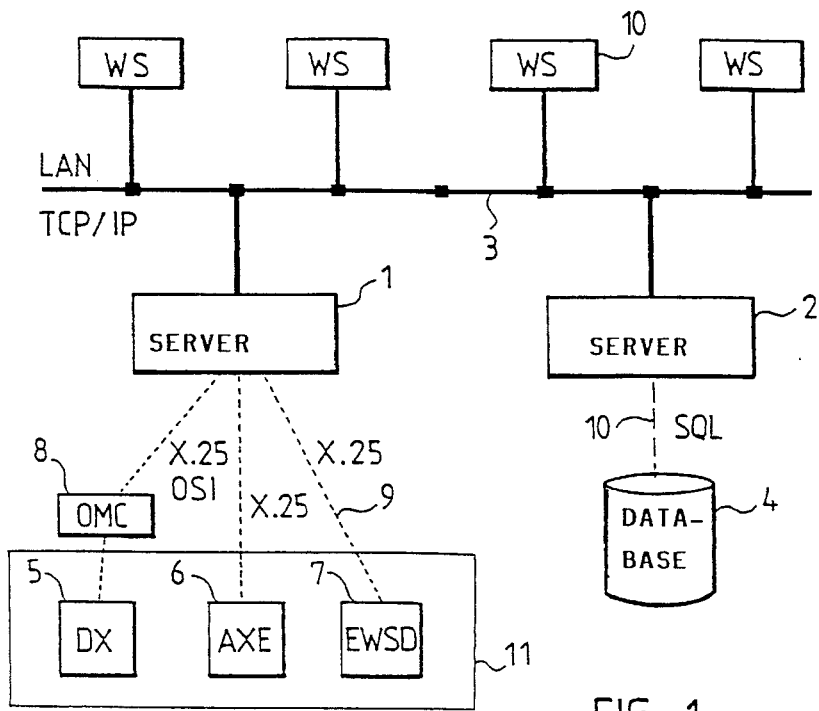
FIG. 1 is a functional block diagram of the network management system of the invention.

The architecture and main operations of the network management system of the invention, and also its features pertaining to user application are described in the following with reference to the block diagram of FIG. 1. The network management system set forth as an example is a distributed system which utilizes a local area network (LAN) and can be flexibly modified and expanded. However, the network management system of the invention can naturally also be implemented with other system architectures. In FIG. 1, the network management system comprises a communications server 1, a database server, and a plurality of work stations 10 connected to a local area network 3. The physical construction of the local area network may be, e.g., Ethernet, and the protocol used therein may be, e.g., TCP/IP. Network management tasks, e.g., for monitoring the configuration, alarms and performance of network elements, such as public telephone exchanges or mobile exchanges, are carried out in application programmes run in the work stations 10 and the servers 1 and 2, for example in open UNIX environment. The database server 2 forms an SQL interface 10 with the network database 4 for the application programs for storing and searching for network management data. The database 4 contains network configuration management data, describing all the network elements, and also possible performance data, billing information, etc.

The communications server 1 forms a gateway between the network management applications and the network elements to be managed. These network elements of the telecommunication system 11 may include e.g. Nokia Telecommunications DX200 switching system 5, LM Ericsson AXE switching system 6, and Siemens EWSD switching system 7 with their control units, as well as circuit and signalling elements in the PSTN and the CCS7 network. The abbreviations DX200, AXE and EWSD will be used hereafter for these network elements. The communications server 1 may have X.25 or Ethernet-based OSI connections to the operation and maintenance center (OMC) for DX200 exchanges, the OMC constituting the highest level of centralized management of the entire network of DX200 exchanges. There may also be a connection directly to a DX200 exchange. The connections between the communications server 1, and the AXE and EWSD exchanges 6, 7 utilize the AXE and EWSD system-specific transmission protocols. The communications server 1 provides three kinds of interfaces: 1) MML (Man-Machine Language) commands or task requests to network elements, 2) file transfer services for transferring files from network elements, and 3) reception of spontaneous responses from network elements.

In principle, different manufacturers have tried to implement the command languages of their network elements in a command language defined by the CCITT recommendations Z.301–Z.341. However, as the definitions of the syntactic and semantic structures of this command language are vague, different manufacturers can choose very different ways of approaching the subject and end up with very different kinds of languages. Moreover, there may be significant differences between the command languages of different system generations of even the same manufacturer. The network management system and the communications server 1 should be capable of communicating with each network element in its own command language. In the system of the invention this has been implemented in such a manner that the users may program all their daily routines into services which are easy to use. The services are network element-independent and contain a suitable user interface with menus and user help texts. The communications server transforms the network element-independent service requests it has received automatically into commands according to the internal command language of the network element that is the target of service by means of software which will hereafter be called a command generator. In other words, the command generator is, in general, software which generates from general and network element-independent service requests the MML commands necessary for performing a task for controlling a certain network element.

Figure 2:
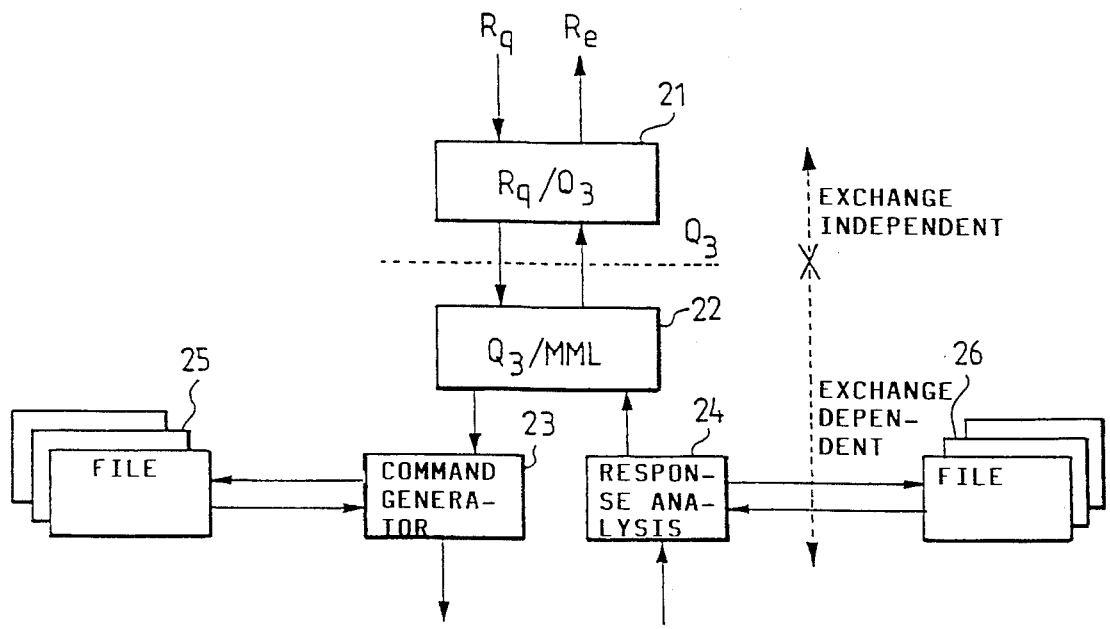
FIG. 2 is a functional block diagram of the command generator included in the communications server of FIG. 1.

The structure and operation of the command generator included in the communications server 1 will be described with reference to the functional block diagram of FIG. 2. The command generator set forth as an example is divided into four functional blocks: verification block 21, logic block 22, command generation block 23, and response analysis block 24. In addition, FIG. 2 shows a memory 25 for storing network element specific parameters describing the command language, and a memory 26 for storing representations of network element specific responses.

The verification block 21 verifies the rationality of the control parameters occurring in the service request Rq from the application program requesting the service, and the state(s) of the network element(s) 5, 6, 7 from the network database 4. In addition to this, the verification block 21, by means of link establishment means (not shown) included in the communications server 1, establishes links to the network element(s) necessary for carrying out the service request, records the received service request Rq as such in a logic file, and transforms the service request, if necessary. The interface between the verification block 21 and the logic block 22 is preferably selected to correspond to the telecommunications interface of the future TMN recommendations Q3 of the CCITT. The future network elements with a TMN interface can thereby be controlled directly through the verification block 21.

The verified service request Rq is supplied from the verification block 21 to the logic block 22, which forms a task containing several network element-dependent MML command requests from a general network element-independent service request Rq. For each network element-independent service and service request there exists a separate task with command requests for each network element or command language required. The task(s) required in each case is (are) selected and started on the basis of the target parameter which is included in the network element-independent service request and which indicates the network element(s) to which the service is directed.

The network element dependent command requests formed by the logic block 22 are supplied to the command generation block 23, which from MML command requests forms the final MML commands according to the internal command language of the network element that is the target of service by means of parameters 25 describing the internal command language of the network element. The parameters may contain, on the one hand, data relating to the command, and, on the other hand, data relating to the syntax of the command. The control parameters given in the service request Rq are included in the commands generated in block 23 in the manner required by the command language in question. From the command generation block 23, the network element-specific commands are supplied to the network element concerned.

In its responses, the network element that is the target of the service request employs network element-specific command responses, which include data relating to the network element. The response analysis block 24 of the command generator receives the network element-specific responses and converts them into a network element independent format which the logic block 22 understands, using the system specific representations of command responses stored in the files 26. By means of the command responses it is possible to control, for example, the state automaton created by the task started by the service request Rq in the logic block. The sending of the first command of the task, for example, may set the state automaton in a certain state where it waits for a response that the command has been completed. When the state automaton receives information from the response analysis block 24 to the effect that this has received a command response indicating that the command has been completed, the state automaton proceeds to the following state, in which it sends the following command. Network element-independent command responses can be further transmitted from the logic block 22 to the verification block 21, and this way as responses Re to application programs.

According to the invention, the internal commands of a network element, such as an exchange, comprise a specific reading command for reading the internal data structures—such as syntactic, semantic and user help data—of any other internal command or command response of the network element. Using this command, the user may automatically control the desired network element from the network management system, read the parameters describing the command language of the network element, and automatically update them in the corresponding file. The reading command may be given directly from the work station, or it may be stored in parameter files and started by a network element independent command as described above.

An example of application programs utilizing a command generator in a network management system of the invention is management of subscriber connections in a telephone exchange. The following service requests, for example, may be associated with this application: creation, deletion, closing or opening of a connection, reading of facilities or charging counters of a connection, change of location of a connection, change of telephone number of a connection.

The accompanying drawings and the description relating thereto are intended merely to illustrate the present invention. In its details the network management system of the invention may vary within the scope of the appended claims.

I claim:

1. A telecommunications network, comprising:

a plurality of network elements having internal command languages, said internal command languages being mutually different in at least two of said network elements, and at least one of said network elements being provided with a reading command for reading internal data structures of any internal command or command response of said at least one of said network elements, a network management system for configuration and reading data or states of said network elements, said system comprising:

memory for storing parameters describing the respective said internal command language of each of said network elements, means for generating service requests in a network-independent format, conversion means for converting said service requests in a network independent format into commands according to the respective said internal command language of a respective said network element which is a target of service, by means of parameters describing the respective said internal command language of said respective network element, means for sending said converted commands to said respective network element which is the target of service, and means for receiving command responses sent by the respective said network element which is the target of service, and for converting said command responses into said network-independent format; and said network management system utilizes said reading command to update said parameters which describe the respective said internal command language of said at least one network element in said memory of said network management system.

2. A telecommunications network according to claim 1, wherein said conversion means of said network management system comprises:

command request means for converting a network element-independent service request into a plurality of network element-dependent command requests, and command generation means for generating network element-dependent commands as a response to said command requests received from said command request means via said parameters describing the respective said internal command language of said respective network element.

3. A telecommunications network according to claim 2, wherein said conversion means of said network management system comprises:

means for verifying said network element-independent service request, and means for initiating establishment of a link to said respective network element which is the target of service.

4. A telecommunications network according to claim 1, wherein:

said internal data structures of said internal command languages of said network elements are substantially in compliance with CCITT recommendations Z.301–Z.341.

5. A telecommunications network according to claim 1, wherein:

said means for generating service requests comprise user application programs.

6. A telecommunications network according to claim 5, wherein:

said user application programs comprise subscriber and line-managing applications for at least one of creating, deleting, closing, opening, and modifying subscriber connections.

7. A telecommunications network according to claim 1, wherein:

at least some of said network elements are telephone exchanges.

8. A telecommunications network according to claim 1, wherein:

at least some of said internal data structures are ones selected from the group consisting of syntactic data, semantic data and user help data.

9. A telecommunications network, comprising:

a plurality of network elements having internal command languages, said internal command languages being mutually different in at least two of said network elements, and at least one of said network elements being provided with a reading command for reading internal data structures of any other internal command or command response in the respective said internal command language of the respective said at least one network element;

a network management for configuration and reading data or states of said network elements, and system comprising memory for storing parameters describing the respective said internal command language of each of said network elements, said network management system utilizes said reading command to update said parameters which describe the respective said internal command language of said at least one network element in said memory of said network management system.

10. A telecommunications network according to claim 9, wherein:

at least some of said network elements are telephone exchanges.

11. A telecommunications network of claim 9, wherein:

at least some of said internal data structures are ones selected from the group consisting of syntactic data and semantic data.

* * * * *